(12) United States Patent
White et al.

(10) Patent No.: US 9,038,691 B2
(45) Date of Patent: May 26, 2015

(54) EXTENDABLE HANDLE FOR A TIRE SPOON AND METHOD OF OPERATION

(75) Inventors: Michael White, Montgomery, MO (US); Robert Jensen, Clarks Grove, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 231 days.

(21) Appl. No.: 13/552,197

(22) Filed: Jul. 18, 2012

(65) Prior Publication Data

US 2014/0020848 A1  Jan. 23, 2014

(51) Int. Cl.
| | |
|---|---|
| *B25B 23/16* | (2006.01) |
| *B25G 1/00* | (2006.01) |
| *B25B 1/04* | (2006.01) |
| *B25G 1/01* | (2006.01) |
| *B25G 1/04* | (2006.01) |
| *B25B 15/02* | (2006.01) |
| *B25G 1/10* | (2006.01) |
| *B60C 25/02* | (2006.01) |
| *B25B 23/00* | (2006.01) |

(52) U.S. Cl.
CPC . *B25G 1/04* (2013.01); *B25B 15/02* (2013.01); *B25G 1/043* (2013.01); *B25G 1/105* (2013.01); *B25B 23/0021* (2013.01); *B60C 25/02* (2013.01)

(58) Field of Classification Search
CPC ........ B25G 1/105; B25G 1/043; B25B 15/02; B25B 23/0021
USPC .................. 81/177.1, 177.2, 489; 279/81, 102
See application file for complete search history.

(56) References Cited

U.S. PATENT DOCUMENTS

| | | | | |
|---|---|---|---|---|
| 3,227,015 | A | * | 1/1966 | Tremblay ..................... 81/177.2 |
| 3,724,884 | A | | 4/1973 | Roider |
| 4,169,687 | A | | 10/1979 | Schull |
| 4,632,597 | A | | 12/1986 | Clausen et al. |
| 4,905,548 | A | * | 3/1990 | Colace et al. ................ 81/177.2 |
| 5,109,737 | A | * | 5/1992 | Raber .......................... 81/177.2 |
| 5,417,511 | A | | 5/1995 | Warden |
| 5,487,529 | A | | 1/1996 | Newville |
| 6,182,539 | B1 | * | 2/2001 | Webster ....................... 81/177.2 |
| 6,301,987 | B1 | * | 10/2001 | Chakri et al. ................ 74/473.3 |
| 6,408,721 | B1 | * | 6/2002 | Lee .................................. 81/60 |
| 7,013,765 | B2 | * | 3/2006 | Chang ......................... 81/177.2 |
| 7,188,553 | B1 | * | 3/2007 | Pryor .......................... 81/177.2 |
| 7,497,149 | B2 | * | 3/2009 | Lin .................................. 81/62 |
| 7,878,094 | B2 | * | 2/2011 | Lin .............................. 81/177.2 |
| 2004/0020331 | A1 | * | 2/2004 | Lee ............................. 81/177.2 |
| 2007/0131070 | A1 | * | 6/2007 | Hull et al. ....................... 81/489 |

\* cited by examiner

*Primary Examiner* — Hadi Shakeri
*Assistant Examiner* — Danny Hong
(74) *Attorney, Agent, or Firm* — Baker & Hostetler LLP

(57) ABSTRACT

An extendable handled tool may include: a shaft; a hollow shaft extension encompassing the shaft and configured to move axially on the shaft so that the shaft moves in and out of the hollow space in the shaft extension; a locking collar attached to the shaft extension, the locking collar configured to rotate on the shaft; a tooth connected to the locking collar such that the tooth rotates with the locking collar; and a locking ring mounted on the shaft, the locking ring configured to fit with the tooth to rotate between a locked position and an unlocked position, wherein the locked position prevents the shaft extension from moving axially with respect to the shaft and the unlocked position permits the shaft extension to move axially with respect to the shaft. A method of exting a handle on a tool may also be provided.

20 Claims, 2 Drawing Sheets

EXTENDABLE HANDLE FOR A TIRE SPOON AND METHOD OF OPERATION

FIELD OF THE INVENTION

The present invention relates generally to tire spoons used to install and remove tires on wheel rims. More particularly, the present invention relates to a tire spoon having an extendable handle.

BACKGROUND OF THE INVENTION

Tire spoons have long been used by mechanics to assist in the installation and/or removal of tires on wheel rims. Tire spoons are one of several pieces of equipment that may be found in auto shops. They are usually long and may be found to be bulky or inconvenient to store. Furthermore some shops may be cramped making it difficult to manipulate a full-length tire spoon. On the other hand, due to the strong forces involved in installing and removing tires from wheel rims, is often desirable to have a long handle on the tire spoon in order to obtain leverage when installing or removing a tire.

Accordingly, it is desirable to provide a method and apparatus that is less bulky to store, may be used in cramped or confined conditions, yet is capable of providing enough leverage to install/or remove a tire from a wheel rim.

SUMMARY OF THE INVENTION

The foregoing needs are met, to a great extent, by the present invention, wherein in one aspect an apparatus is provided that in some embodiments a tire spoon that is less bulky to store, may be used in cramped or confined conditions, yet is capable of providing enough leverage to install/or remove a tire from a wheel rim.

In accordance with one embodiment of the present invention, a tool having an extendable handle is provided. The tool includes: a shaft; a hollow shaft extension encompassing at least part of the shaft and configured to move axially on the shaft so that the shaft moves in and out of the hollow space in the shaft extension; a locking collar attached to the shaft extension, the locking collar configured to rotate on the shaft; an actuating tooth on the locking collar and connected to the locking collar such that the tooth rotates with the locking collar; and a lock ring mounted on the shaft, the lock ring having a void dimensioned to permit the actuating tooth to fit in the void, the lock ring configured to rotate on the shaft between a locked position and an unlocked position, wherein the locked position prevents the shaft extension from moving axially with respect to the shaft and the unlocked position permits the shaft extension to move axially with respect to the shaft.

In accordance with another embodiment of the present invention, a method of extending a handle of a tool is provided. The method includes: providing a shaft; providing a hollow shaft extension encompassing the shaft and configured to move axially on the shaft so that the shaft moves in and out of the hollow space in the shaft extension; providing a locking collar attached to the shaft extension, the locking collar configured to rotate on the shaft; locating an actuating tooth on the locking collar and connected to the locking collar such that the tooth rotates with the locking collar; and mounting a lock ring on the shaft, the lock ring having a void dimensioned to permit the actuating tooth to fit, the lock ring configured to rotate on the shaft between a locked position and an unlocked position, wherein the lock position prevents the shaft extension from moving axially with respect to the shaft and the unlocked position permits the shaft extension to move axially with respect to the shaft.

In accordance with yet another embodiment of the present invention, a tool having an extendable handle may be provided. The tool may include: a shaft; a hollow shaft extension encompassing the shaft and configured to move axially on the shaft so that the shaft moves in and out of the hollow space in the shaft extension; a locking collar attached to the shaft extension, the locking collar configured to rotate on the shaft; a means for actuating connected to the locking collar such that the means for actuating rotates with the locking collar; and a camming means mounted on the shaft, the camming means configured to be actuated by the means for actuating the camming means between a locked position and an unlocked position, wherein the locked position prevents the shaft extension from moving axially with respect to the shaft and the unlocked position permits the shaft extension to move axially with respect to the shaft.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
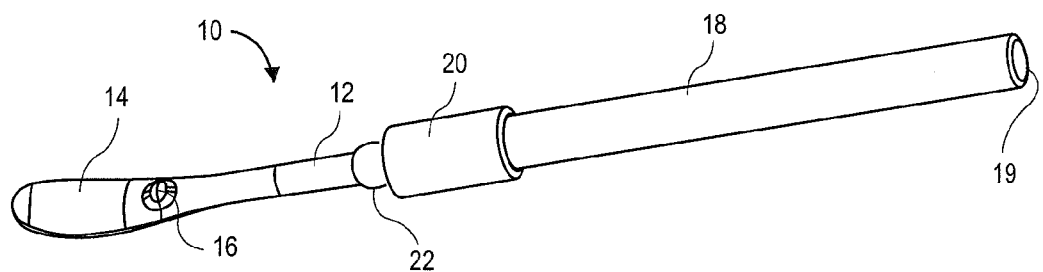
FIG. 1 is a perspective view of a tire spoon in accordance with an embodiment of the invention.

The invention will now be described with reference to the drawing figures, in which like reference numerals refer to like parts throughout. An embodiment in accordance with the present invention provides a tire spoon having an extendable handle. The tire spoon is configured to have a section movable to extend to an outward position and retract on inward position. Furthermore, in some embodiments in accordance with the invention, the handle of the tire spoon can be locked in various positions by twisting the locking collar.

FIG. 1 illustrates an extendable handle tire spoon 10. The extendable handle tire spoon 10 includes a shaft 12. In some embodiments in accordance with the invention, the shaft 12 may be made of carbon steel or other suitable materials. A spoon portion 14 is located at one end of the shaft 12. The spoon portion 14 may be flattened. The spoon shape as is well known in the tire spoon art. A catch 16 is located near the spoon portion 14 on the shaft 12. The catch 16 assists the user in using the extendable handle tire spoon 12 to prevent the user from inadvertently inserting the spoon portion 14 too far between the tire and rim. The catch 16 will butt up against the wall of a tire or against the rim thereby limiting the amount the spoon portion 14 will penetrate between a tire and rim.

The extendable handle tire spoon 10 also includes a handle 18, also referred to as an extendable shaft 18. The extendable shaft 18 is hollow and surrounds at least a portion of the shaft 12 that extends into the hollow portion 19 of the hollow extendable shaft 18.

The extendable handle tire spoon 10 also includes a lock collar 20. The lock collar 20 is attached to the extendable shaft portion or handle 18. In some embodiments in accordance with the invention, the lock collar 20 is relatively attached to the extendable shaft 18. In other embodiments the collar 20 and extendable shaft 18 are attached and other using other methods. For example, the lock collar 20 may be connected to the extendable shaft 18 with fasteners, a lock ring (as shown and described herein) a press fit connection, an adhesive, or any other suitable manner of attaching the collar 20 with the extendable shaft portion 18.

A collar stop 22 is located on the shaft 12. The collar stop 22 may be simply a thick portion of the shaft 12. In other embodiments, the collar stop 22 may be a separate piece or feature attached to the shaft 12. The collar stop 22 is dimensioned and designed to prevent the shaft 22 from moving into the hollow 19 extendable shaft portion 18 beyond a desired distance. As shown in FIG. 1 the collar 20 will contact the collar stop 22 thereby preventing the shaft 12 from moving further into the hollow 19 extendable shaft portion 18.

Figure 2:
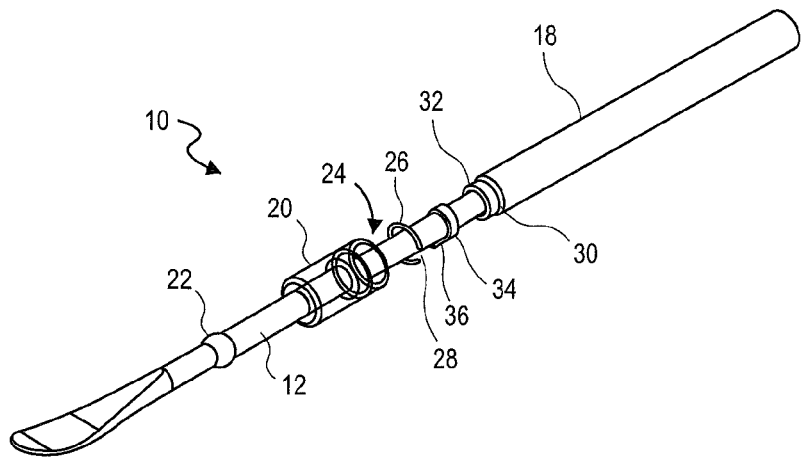
FIG. 2 is a perspective view of a tire spoon where the lock collar is shown in a see-through configuration and the lock collar the shaft extension and internal components are showed in an exploded view.

FIG. 2 is a perspective view of an extendable handle tire spoon 10 in accordance with an embodiment of the invention. FIG. 2 shows the collar 20 in a see-through manner. The extendable shaft portion 18 is shown detached an exploded view away from the collar 20. The interior pieces 24 of the collar 20 are also illustrated. For example, the retaining ring 26 having an open end 28 is shown. The ring groove 30 on the reduced diameter portion 32 of the extendable shaft portion 18 is also shown. A camming ring 34 also referred to herein as a locking ring 34 is shown mounted on to the shaft 12. The camming ring or lock ring 34 has a camming ring projection 36.

It will be appreciated by one of ordinary skill in the art that the reduced diameter portion 32 of the extendable shaft portion 18 is normally fit into the collar 20. The collar 20 also contains the retaining ring 26, the camming ring 34 and camming ring projection 36.

Figure 3:
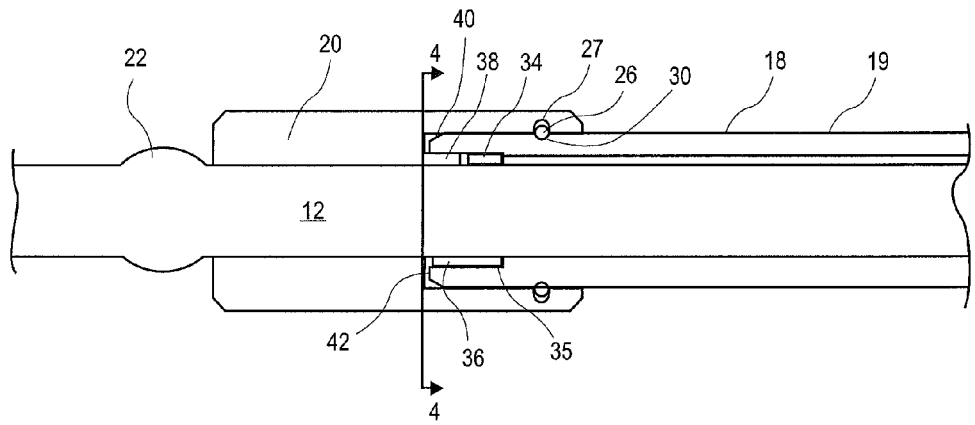
FIG. 3 is a axial cross-sectional view of the tire spoon, lock collar and shaft extension.

FIG. 3 is a partial cross-sectional view of an extendable handle tire spoon 10 in accordance with an embodiment of the invention. FIG. 3 illustrates the shaft 12 extending through the collar 20 and the extendable shaft portion 18. The collar stop 22 is also shown.

In the embodiment shown in FIG. 3, the collar 20 attaches to the extendable shaft portion 18 by means of a retaining ring 26. The retaining ring 26 is fit within a groove 27 in the collar 20 and a retaining groove 30 located on the reduced diameter portion 32 of the extendable shaft portion 18. Using a system of a retaining ring 26 and retaining ring grooves 27 and 30 is an alternate way of attaching the collar 20 the extendable shaft portion 18 in addition to threads, press fit, fasteners, or any other suitable manner.

As shown in FIG. 3 a lock ring or camming ring 34 is contained within a wider diameter portion 35 with in the extendable shaft portion 18. The camming ring 34 has a camming ring projection 36 visible. An actuating tooth 38 connected to the collar 20 is fit with in a void in the camming ring 34. The void maybe defined at least in part by the camming ring projection 36. The actuating tooth 38 is configured to urge against the cam ring projection 36 when the collar 20 is rotated to rotate the cam ring 34.

The front portion 42 of the extendable shaft portion 18 is shown. In some embodiments the front portion 42 has a beveled edge 40.

Figure 4:
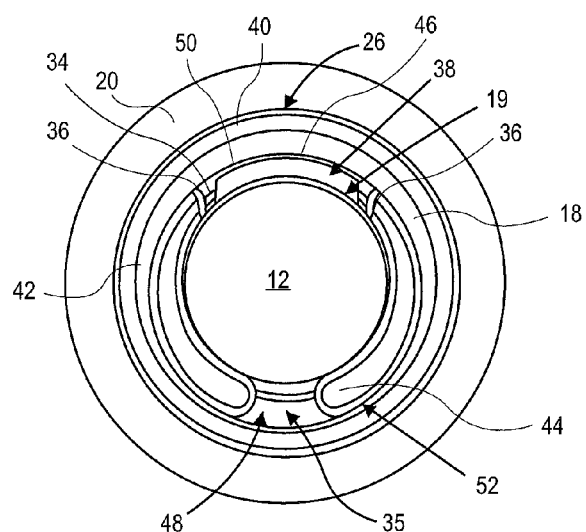
FIG. 4 is a radial cross-sectional view of the tire spoon taken along line 4-4 in FIG. 3.

FIG. 4 is a cross-sectional view taken along the line 4-4 shown in FIG. 3. FIG. 4 shows the shaft 12 supporting the camming ring 34. The wider diameter portion 35 is, in some embodiments, an eccentric or off center counter bore. As a result of the wider diameter portion 35 being off center, when the shaft 12 is in inserted through the hollow portion 19 of the extendable shaft portion 18, the off center wire diameter portion 35 will define a wide section 48 of relief between the shaft 12 and the wider diameter portion 35 of the hollow portion 19 of the extendable shaft portion 18 and a thin section 50 of relief between the shaft 12 and the wider diameter portion 35 of the hollow portion 19 of the extendable shaft portion 18.

The camming ring 34 also has a thick side 44 and a thin side 46. When the thin side 46 of the camming ring 34 is fit with in the thin section 50 of the wider diameter portion 35, the lock collar 20 is not in a locking position. The extendable shaft portion 18 is free to move axially along the shaft 12. Thereby allowing a user to adjust the length of the shaft 12 and extendable handle portion 18.

When a user twists the collar 20, the actuating tooth 38 will urge against the camming ring projection 36 thereby rotating the camming ring 34 on the shaft 12. When the camming ring 34 is rotated on the shaft 12 the thick side 44 of the camming ring 34 will be wedged into the thin section 50 defined by the wider diameter portion 35. This wedging action will wedge the camming ring 34 in between the wider diameter portion 35 of the extendable shaft portion 18 and the shaft 12 thereby locking the extendable shaft portion 18 to the shaft 12 by a friction fit.

When a user desires to unlock the extendable shaft portion 18 from the shaft 12, the user may turn the collar 20 in the opposite direction causing the actuating tooth 18 to rotate the camming ring 34 in a manner which will push the thick side 44 of the camming ring 34 back toward the wide section 48 of the wider diameter portion 35. The camming ring 34 will move to an unlocking position where the thin side 46 of the camming ring 34 will be fit with in the thin section 50 and the thick side 44 of the camming ring 34 will be fit with in the wide section 48.

When the collar 20 being in a unlocked position this position is considered an initial position. The thick side 44 of the camming ring 34 will be in the wide section 48 of the reduced diameter portion 32 and the thin side 46 of the camming ring 34 will be in the thin section 50 of the reduced outer portion 32. In such a condition, the extendable shaft portion or handle 18 will be free to move axially along the shaft 12. A user may then move the extendable shaft portion 18 axially on the shaft 12 till the user finds a length that the user desires. Then the user may rotate the collar 20 either clockwise or counter-clockwise thereby engaging the actuating tooth 38 with the cam ring projection 36 to turn the camming ring 34. Turning the camming ring 34 will have the effect of moving the thin side 46 of the camming ring 34 out of the thin section 50 and into the wide side 48 of the wider diameter portion 35 and moving the thick side 44 of the camming ring 34 out of the wide section 48 of the wider diameter portion 35 and wedging it into the thin section 50 of the wider diameter portion 35 thereby wedging the thick side 44 against the shaft 12 and the wider diameter portion 35.

The user may unlock the extendable shaft portion 18 to the shaft 12 by simply rotating the collar 20 in the opposite direction. When the user rotates the collar 20 in the opposite direction, the collar 20 will move to an unlocking position where the actuating tooth 38 engages the camming ring projection 36 to rotate the camming 34 ring to move the thick side 44 of the camming ring 34 out of the thin section 50 of the wider diameter portion 35 and move, the thick side 44 of the wider portion 35 to the wide section 48 thereby releasing the friction or interference fit between the collar 20 the camming ring 34 in the shaft 12.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A tool having an extendable handle comprising:
    a shaft;
    a hollow shaft extension encompassing at least part of the shaft and configured to move axially on the shaft so that the shaft moves in and out of a hollow space in the shaft extension;
    a locking collar attached to the shaft extension, the locking collar configured to rotate on the shaft;
    an actuating tooth on the locking collar and connected to the locking collar such that the tooth rotates with the locking collar; and
    a lock ring mounted on the shaft, the lock ring having a void dimensioned to permit the actuating tooth to fit in the void, the lock ring configured to rotate on the shaft between a locked position and an unlocked position,
    wherein the locked position prevents the shaft extension from moving axially with respect to the shaft and the unlocked position permits the shaft extension to move axially with respect to the shaft.

2. The tool of claim 1, further including an off center counter bore on the hollow shaft extension dimensioned to encompass the lock ring.

3. The tool of claim 2, wherein the off center counter bore defines a narrow relief portion between the hollow shaft extension and the lock ring and a large relief portion between the hollow shaft extension and the lock ring.

4. The tool of claim 3, wherein the lock ring has a thick portion and a thin portion.

5. The tool of claim 4, wherein the thick portion of the lock ring is in the narrow relief portion when the lock ring in in the locked position and the thick portion of the lock ring is in the large relief portion when the lock ring is in the unlocked position.

6. The tool of claim 5, wherein the locking is achieved by wedging the locking collar in the counter bore between the shaft and the hollow shaft extension.

7. The tool of claim 1, further including a collar stop located on the shaft to prevent the shaft from moving an undesired distance into the collar.

8. The tool of claim 1, wherein at least part of the hollow shaft extension is a handle.

9. The tool of claim 1, further including an O-ring located between the collar and the shaft extension.

10. The tool of claim 1, wherein the void is located in a thin portion of the locking ring.

11. The tool of claim 1, wherein a tire spoon is located at an end of the shaft.

12. The tool of claim 1, wherein the collar attached to the hollow shaft extension via one of: threads, a retaining ring, a press fit, and an adhesive.

13. The tool of claim 1, wherein the hollow shaft extension is locked to the shaft by twisting the collar in a first direction.

14. The tool of claim 1, wherein the hollow shaft extension is unlocked from the shaft by twisting the collar in a second direction.

15. The tool of claim 1, wherein the shaft is made of steel.

16. A method of adjusting a handle length on a tool comprising:
    providing a shaft;
    providing a hollow shaft extension encompassing the shaft and configured to move axially on the shaft so that the shaft moves in and out of a hollow space in the shaft extension;
    providing a locking collar attached to the shaft extension, the locking collar configured to rotate on the shaft;
    locating an actuating tooth on the locking collar and connected to the locking collar such that the tooth rotates with the locking collar; and
    mounting a lock ring on the shaft, the lock ring having a void dimensioned to permit the actuating tooth to fit, the lock ring configured to rotate on the shaft between a locked position and an unlocked position,
    wherein the lock position prevents the shaft extension from moving axially with respect to the shaft and the unlocked position permits the shaft extension to move axially with respect to the shaft.

17. The method of claim 16, further including providing an off center counter bore on the hollow shaft extension dimensioned to encompass the lock ring, wherein the off center counter bore defines a narrow relief portion between the hollow shaft extension and the lock ring and a large relief portion between the hollow shaft extension and the lock ring.

18. The method of claim 17, wherein the lock ring has a thick portion and a thin portion and wherein the locking is achieved by wedging the locking collar in the counter bore between the shaft and the hollow shaft extension.

19. The method of claim 18, wherein the wedging is accomplished by twisting the collar.

20. A tool having an extendable handle comprising:
    a shaft;
    a hollow shaft extension encompassing the shaft and configured to move axially on the shaft so that the shaft moves in and out of a hollow space in the shaft extension;
    a locking collar attached to the shaft extension, the locking collar configured to rotate on the shaft;
    a means for actuating connected to the locking collar such that the means for actuating rotates with the locking collar; and
    a camming means mounted on the shaft, the camming means configured to be actuated by the means for actuating the camming means between a locked position and an unlocked position, wherein the locked position prevents the shaft extension from moving axially with respect to the shaft and the unlocked position permits the shaft extension to move axially with respect to the shaft.

* * * * *